United States Patent
Wellan et al.

[15] 3,680,285
[45] Aug. 1, 1972

[54] MODULAR BAG-TYPE FILTER FOR GASES

[72] Inventors: Wayne G. Wellan; John O. Converse; Arden E. Swanson, all of Minneapolis, Minn.

[73] Assignee: Hart-Carter Company, Minneapolis, Minn.

[22] Filed: Nov. 23, 1970

[21] Appl. No.: 91,816

[52] U.S. Cl. .................55/302, 55/341, 55/374, 55/379, 55/502, 55/508, 285/158, 285/361
[51] Int. Cl. ..............................................B01d 46/04
[58] Field of Search........55/271, 272, 273, 282, 283, 55/302, 341, 502, 508, 374, 378, 379; 285/158, 361, 396, 402

[56] References Cited

UNITED STATES PATENTS 3,394,532  7/1968  Oetiker............................55/302

FOREIGN PATENTS OR APPLICATIONS 1,289,019  2/1962  France............................55/302

Primary Examiner—Dennis E. Talbert, Jr.
Attorney—Rummler & Snow

[57] ABSTRACT

A dust filter module having a hollow housing in which a plurality of tubular filter bags are arranged in several parallel rows and suspended from a tube sheet separating a dusty air section from a clean air section of the housing interior, the filter bags hanging into the dusty air section with their upper ends opening into the clean air section through respective apertures in the tube sheet, each filter bag having a rigid collar at its open end adapted to be removably attached to the tube sheet from the dusty air side thereof by a bayonet-type connection. A reverse flow filter bag flushing system is provided in which a flushing air conduit for each row of filter bags extends into the clean air section directly above and parallel with the respective row of filter bags and has a series of individual spouts each directed into a flow nozzle extending into the open end of a respective filter bag. The several conduits have their outer ends extending into a common valve chest which has direct connection with a reservoir of compressed air and which includes individual pilot-controlled pressure-actuated diaphragms each contoured to engage and normally close the outer end of a respective flushing air conduit, and means is provided for operating said diaphragms sequentially.

16 Claims, 10 Drawing Figures

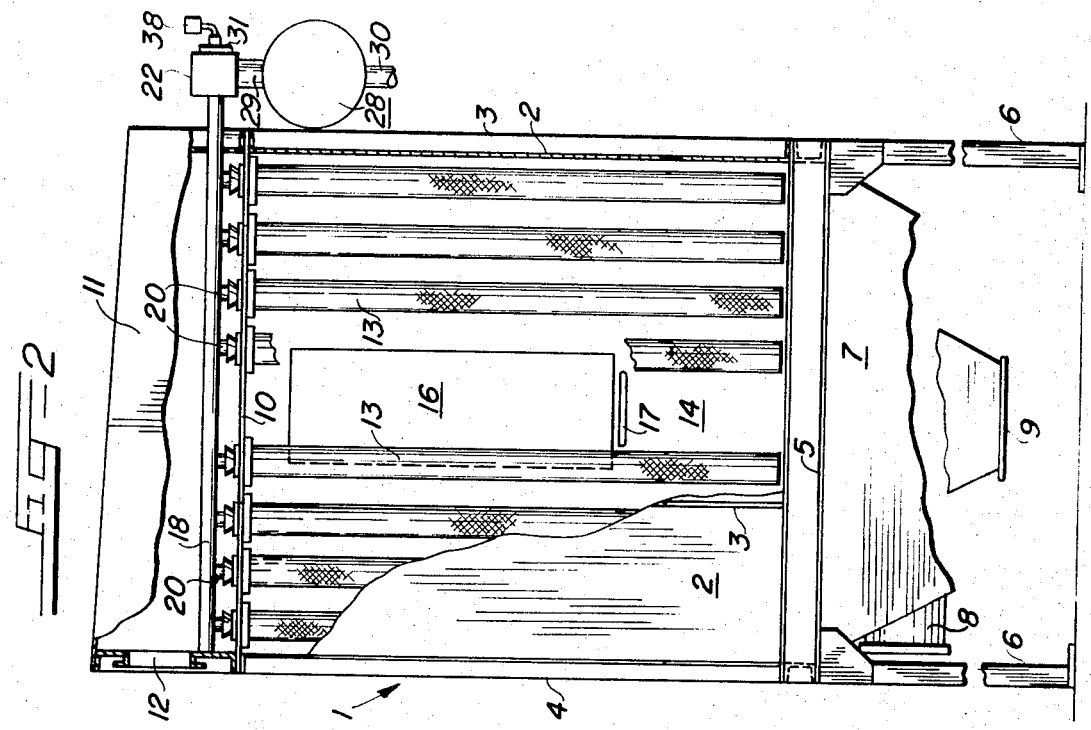
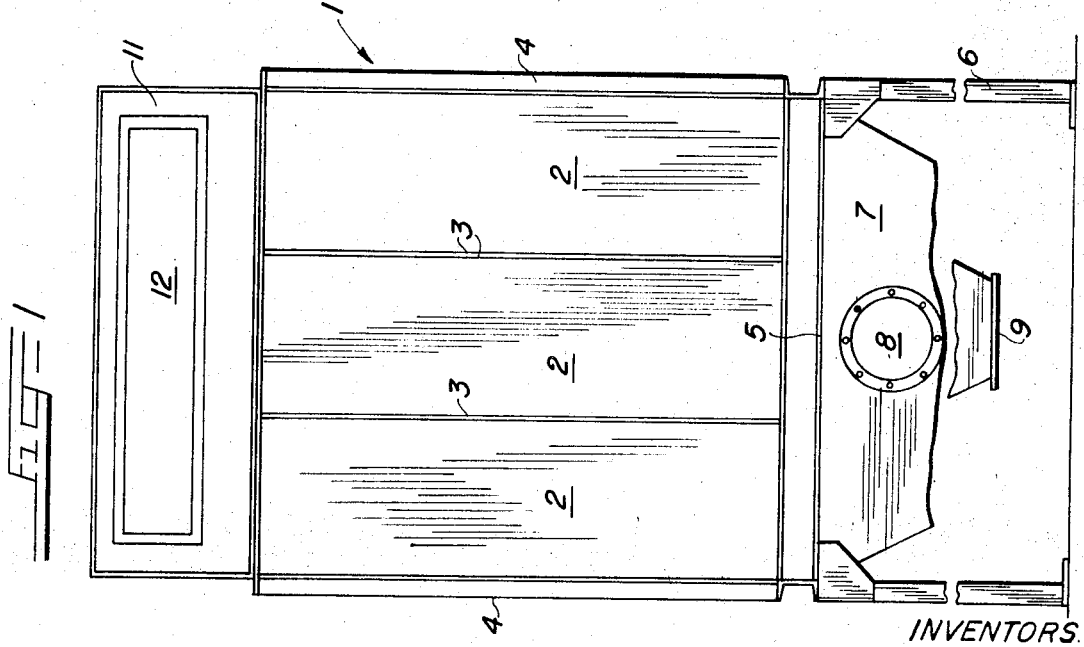

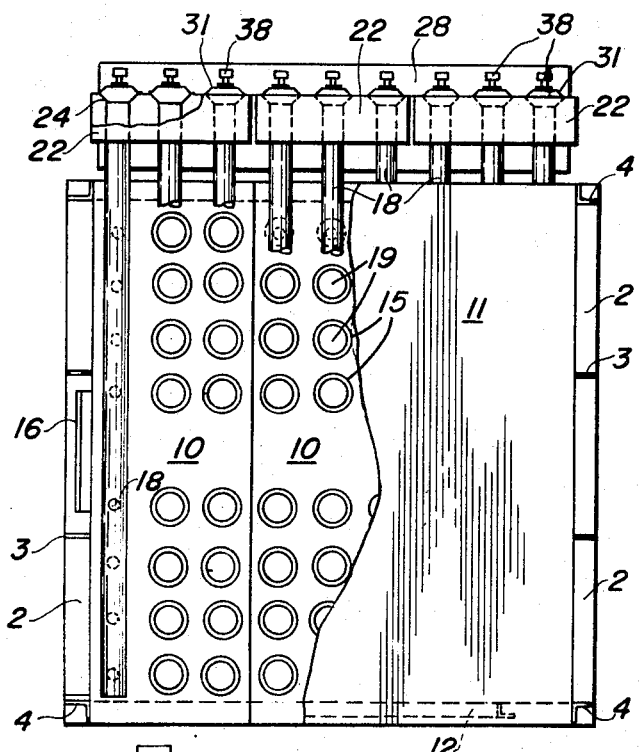
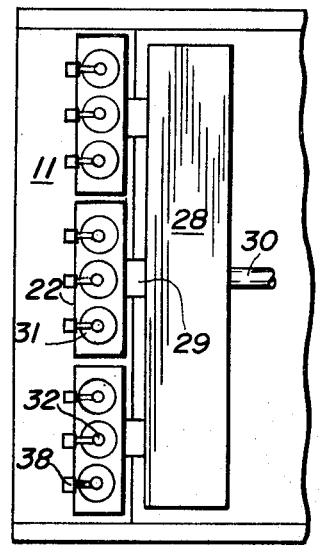
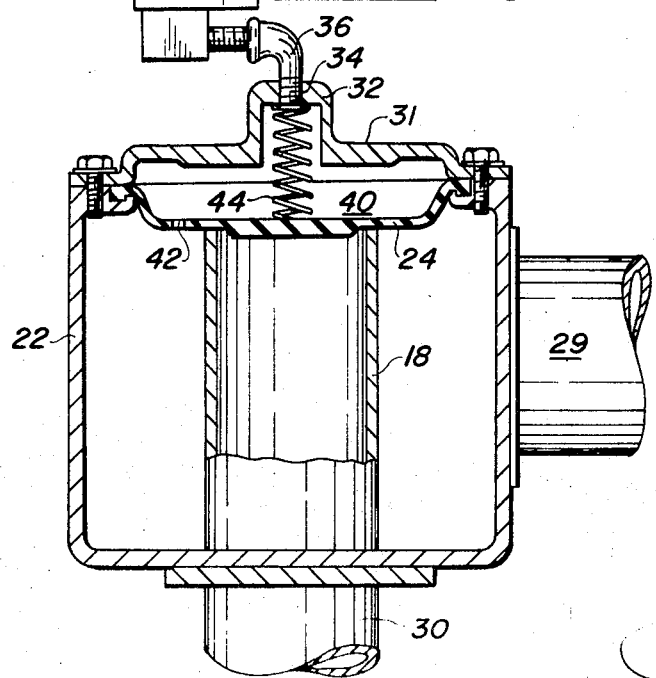
INVENTORS.
WAYNE G. WELLAN
JOHN O. CONVERSE
ARDEN E. SWANSON

INVENTORS.
WAYNE G. WELLAN
JOHN O. CONVERSE
ARDEN E. SWANSON

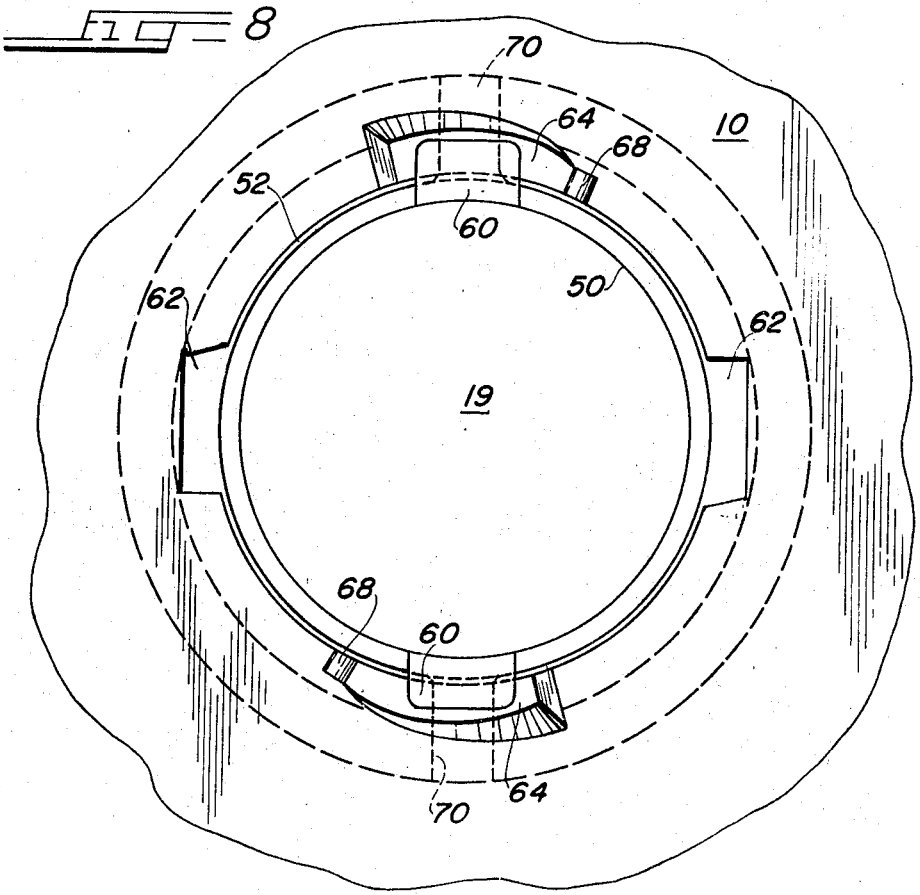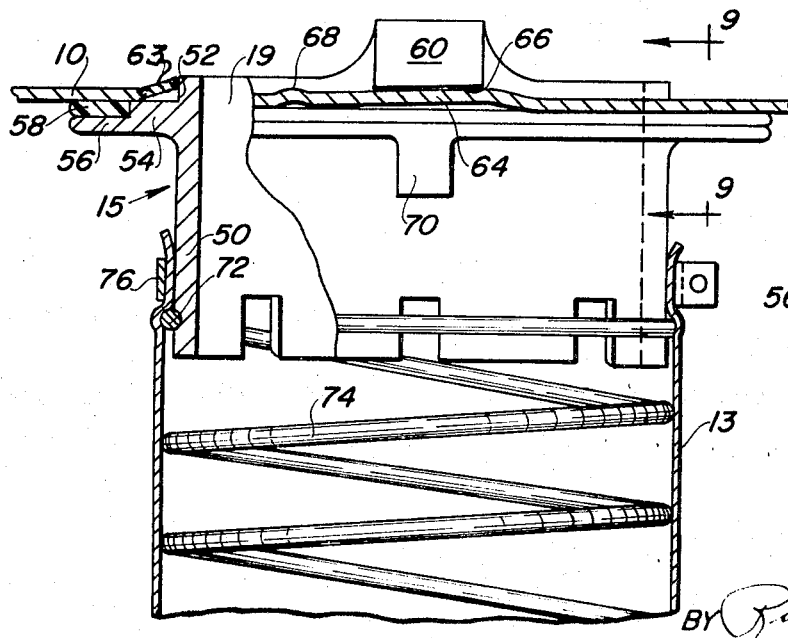
INVENTORS.
WAYNE G. WELLAN
JOHN O. CONVERSE
ARDEN E. SWANSON

MODULAR BAG-TYPE FILTER FOR GASES

BACKGROUND OF THE INVENTION

Dust filters of the bag type for cleaning a gaseous medium and arranged for reverse flow of a bag-flushing gas are well known in the art and many arrangements for initiating and controlling the flow of the flushing gas, whereby sections of the filter system are periodically and sequentially cleaned so as to avoid interruption of filter plant operation, have been heretofore proposed and adopted. In all such systems, the flushing gas is introduced into and through the filtering medium under a pressure greater than the filter pressure of the system, that is the differential between the dirty air and clean air sides of the filter medium, and rather expensive apparatus and control means have had to be employed for accomplishing adequate filter flushing and for controlling the sequential operation thereof.

In systems where the entire amount of flushing gas is introduced into the filter bags of an induced-flow type of filter, where the outlet of the filter connects to the inlet of the fan, either a traveling flushing-gas supply head has been used for engaging the filter bag openings individually and successively, or an individually valved gas injection nozzle has had to be installed for each filter bag opening. This not only entails rather costly and cumbersome mechanical equipment, as in the case of the traveling head type of flushing-gas supply, or a costly arrangement of flow valves and control means for the sequential operation thereof has had to be used. On the other hand, in those systems where a plurality of filter bags are flushed or purged simultaneously, the reverse flow of the main volume of the flushing medium has had to be induced from the clean air side of the filter by the use of high pressure jets directed through a venturi nozzle arrangement at the mouth of each filter bag. This again entails a costly construction for the filtering apparatus and in many cases unsatisfactory cleansing or purging of the filter medium because the jet-induced flow of back-flushing gas is insufficient.

The primary purpose of the present invention is not only to overcome these objectionable characteristics found in prior dust filter systems, but also to provide a more efficient dust filter construction in which there are substantially no mechanical moving parts and which can be constructed in a modular form wherein each unit is a complete operating entity but of such a nature that any number of such units can be combined in side-by-side "building-block" relation to provide a filter plant of substantially any desired size.

A further object of the present invention is to improve the construction of the filter itself whereby filter bags can be readily removed and replaced from the interior of the filter housing without the need of special tools or structural dismantling operations and without disturbing in any way the various air flow connections or filter-flushing apparatus.

SUMMARY OF THE INVENTION

This invention provides a modular form of dust filter having a plurality of rows of tubular filter bags depending from a tube sheet separating the clean air filter section from the dusty air section and opening into said clean air section, said filter including a reverse flow filter bag flushing system characterized by having a flushing air conduit or ejector tube for each row of filter bags, each of said conduits extending into the clean air section from the rear end thereof and being disposed directly above and parallel with a respective row of filter bag openings, each conduit having a series of discharge spouts of which one is directed into a concentric flow nozzle extending into each filter bag opening for discharging pressured air thereinto and simultaneously inducing a back-flow of air from the clean air section, each of said conduits having an open outer end extending into a hollow valve chest which has direct connection with a reservoir of pressured air, the said open end of each conduit being normally closed by an individual pilot-controlled pressure-actuated diaphragm, and each filter bag having a rigid collar at its open end adapted for insertion into a respective opening in the tube sheet and making a rotary bayonet-type air-tight connection with the tube sheet through self-locking engagement with formations on the margin of the said tube sheet opening.

DESCRIPTION OF THE DRAWINGS

FIG. 1 is a front elevational view of a single unit or module composed of nine rows of a dust filter according to this invention in which the unit is of eight filter bags each;

FIG. 2 is an end elevational view of the same with the end wall partly broken away to show the arrangement of the filter bags in a single line of bags extending across the width of the filter unit;

FIG. 3 is a top plan view of the same showing the clean air chamber partly broken away to show a group or basic section arrangement of three rows of filter bag outlets over the area of the tube sheet and the arrangement of the valve chests for the reverse flow filter bag flushing system, one of the valve chests being partly broken away to show its interior;

FIG. 4 is a fragmentary elevational view of the back side of the filter module showing the arrangement of the basic section valve chests and the compressed air supply means for the filter bag flushing system;

FIG. 5 is a detailed sectional view of a valve chest, showing the form and arrangement of the diaphragm valve for releasing a pulse of filter bag flushing air;

FIG. 8 is a fragmentary plan view of the tube sheet with the improved filter bag collar mounted in a tube sheet opening and in locked position;

FIG. 9 is a fragmentary elevational view of the same, with parts broken away, illustrating the form of the filter bag collar and the collar-locking formation of the margin of the tube sheet opening; and FIG. 10 is a fragmentary elevational view of the upper portion of the filter bag collar illustrating the form and arrangement of bayonet-joint locking lug.

DESCRIPTION OF A PREFERRED EMBODIMENT

Figure 6:
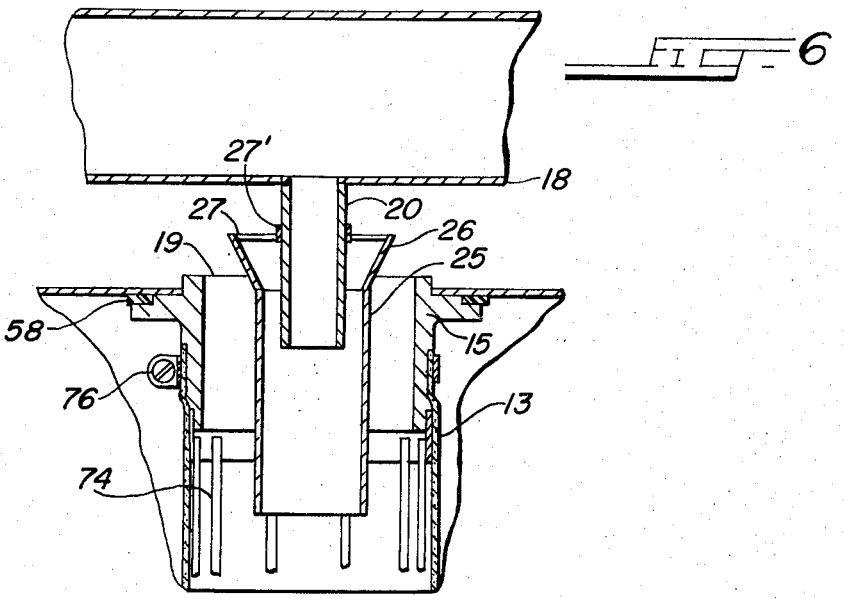
FIG. 6 is a fragmentary sectional view showing in detail the arrangement of the ejector tube spout and flow nozzle with respect to the filter bag collar.

In the form shown in the drawings, the improved dust filter module comprises a rectangular housing 1, each side wall of which is formed of three identical panels 2 suitably secured together by means of outwardly projecting flanges 3, each pair of corner panels of the housing being secured together by means of a vertical angle member 4 disposed with its legs in face-to-face relation with the adjacent flanges 3 of the wall panels. The bottom of the housing or filter body 1 is open over its entire area and the wall panels 2 rest upon a frame of channels 5 suitably connected to form a hollow rectangular base or platform. This platform is supported on angle iron legs 6 of suitable height to accommodate a hopper 7 which depends from the open bottom of the filter housing and into which dust laden air enters the filter through a suitable flanged inlet passage 8, the hopper being of inverted-pyramidal form terminating at its bottom end in a discharge opening 9 adapted for connection to suitable means (not shown) for disposing of the dust accumulation resulting from operation of the filter.

As shown, the filter housing is divided into an upper clean air section and a lower dusty air section by a tube sheet 10 which is installed so as to seal off one section from the other, the clean air section 11 having a clean air outlet 12 and the dusty air section opening directly into the hopper 7. The tube sheet 10 supports the hollow tubular filter bags 13 and is provided with a suitable opening for each bag through which the filtered gas, whatever it may be, enters the clean air section 11.

As shown, the improved dust filter module comprises three basic sections, each containing three rows of the filter bags 13 hanging from the tube sheet 10 and each row containing eight bags, as indicated in FIGS. 2 and 3. Also, as shown, each row of filter bags is divided midway of its length to provide a central passage 14 through the filter body and across the rows of filter bags whereby access to the interior of the filter body can be had for inspection and replacement of the filter bags 13, each of which is removably attached to the tube sheet 10 by means of a mounting collar 15 to be hereafter described. A hinged access door 16 is provided at one end of the filter housing and a catwalk 17 is installed lengthwise of the passage 14 at a suitable level so that an operator can reach all parts of the tube sheet 10 for installation or removal of the filter bags 13.

A particular feature of the improved modular form of dust filter herein described is the arrangement whereby all of the filter bags comprising a row thereof are simultaneously cleaned or purged of accumulated dust by means of a reverse-flow clean-gas flushing operation. This is accomplished by means of a flushing-gas conduit or ejector tube 18 which extends lengthwise of the row of filter bags directly above the filtered gas outlet openings 19 thereof and is provided with a series of discharge spouts 20, one for each opening and directed axially thereinto.

Each of the three flushing gas conduits or ejector tubes 18 of a basic portion of the filter module extends outwardly from the clean gas section 11, at the rear side thereof, and into a valve chest which, as shown, is a hollow rectangular box-like structure 22 that encloses the rear ends of the three conduits 18. The flow of flushing gas into each tube or conduit 18 is controlled by a respective diaphragm-type valving element 24 (FIG. 5) contoured and arranged to normally close the outer end of the conduit. Thus, as shown in FIG. 3, each basic section of the improved dust filter module has its own valve chest 22 for housing and individually valving the outer ends of the respective ejector tubes or flushing gas conduits 18. Each of the three valve chests 22 of the filter module is connected to a reservoir 28 of pressured gas by means of a pipe 29 which opens from the reservoir 28 directly into the bottom side of the valve chest 22 at about the center thereof. Thus, with the outer end of each of the conduits 18 closed by a respective diaphragm 24, the three valve chests are simultaneously under pressure from the common source 28 which is supplied by a suitable compressor, not shown, thru the inlet pipe 30.

As shown in FIG. 5 and indicated in FIG. 3, the diaphragm 24 is the operating member of a remote-pilot-operated two-way valve structure formed on the rear wall of the valve chest 22, this valve structure being mounted in an annular opening in the rear wall of the valve chest 22 and comprising a dish-shaped diaphragm clamped in air-tight relation on the margin of the opening 23 by means of a closure plate or bonnet member 31. The bonnet member 31 has a hollow outwardly-projecting boss 32, centrally located with respect to the diaphragm 24, and the boss has a threaded opening 34 for a pilot connection or bleed pipe 36 leading to a remotely-operated pilot valve 38, which may be of any suitable kind such as a normally-closed solenoid-actuated air valve.

The diaphragm 24 normally rests directly against the outer end of the ejector tube or gas conduit 18 and is normally held in conduit-closing position by means of gas pressure in the space 40 between the diaphragm 24 and the bonnet 31, the gas pressure in the space 40 being the same as that within the interior of the valve chest 22, by way of a suitably small orifice 42 formed in the wall of the diaphragm 24, outside of the diaphragm area engaging the end of the conduit 18, and thru which the pressure on both sides of the diaphragm becomes equalized.

It will be understood that with this type of pilot-operated diaphragm valve structure, the diaphragm is operated by the opening and closing of a bleed line from the space 40 controlled by the remotely-controlled pilot valve 38. Thus, when the pilot valve 38 opens, pressure in the space 40 above the main valve diaphragm 24 is immediately relieved through the bleed connection 36 and the main gas pressure within the valve chest 22 acts against the under side of the diaphragm to rapidly lift the diaphragm and open the outer end of the conduit 18 to allow an immediate flow of the pressured gas into and through the conduit 18 with a subsequent pressure reduction in the chest 22. When the pilot valve closes, the diaphragm is immediately reseated by spring 44, and the gas pressure within the valve chest 22, being increased from the reservoir 28 thru the connection 29, flows to the reverse side of the diaphragm 24 thru the diaphragm orifice 42, this build-up of pressure in the space 40 clamping the diaphragm firmly against the outer end of the conduit 18 to seal the same.

As shown in FIG. 6, each spout 20 depending from an ejector tube or conduit 18 is provided with a concentric flow nozzle 25 of larger diameter, about 100 percent as shown, which extends thru the filter bag collar 15 and into the upper end of the filter bag 13 a distance about equal to the bag diameter. This flow nozzle 25 is formed with a funnel-like inlet cone 26 which opens into the clean air filter section 11, around the spout 20, and the flow nozzle is suitably mounted to the spout 20 as by means of the spider arms 27 extending from a collar 27' to the upper end of the inlet cone 26.

Upon the snap opening of the outer end of the flushing gas ejector tube or conduit 18 by release of the diaphragm, an immediate flow of pressured gas fills the conduit 18 and discharges outwardly therefrom as a discrete puff or volume of gas from each of the nozzles 20 whereby a sudden pulse or jet of flushing gas is forced into each flow nozzle and thence into the respective filter bag 13. This causes the flow nozzle to function as a jet pump and induce a reverse flow of filtered air, from the clean air section of the filter, which is of a volume substantially as large as that of the jet and the total air flow into each filter bag so produced cleanses or purges the filter bags by a reverse-flow of gas thru the filter bag fabric which dislodges dust accumulated on the outer surface thereof so that the dust drops into the hopper at the bottom of the dust filter structure. As shown, the flow nozzle is made of relatively thin material and offers only a very small reduction of filter bag outlet area for normal air flow during filtering operation.

The sudden discharge of flushing gas from the valve chest 22 into a conduit 18 results in an immediate pressure drop within the valve chest 22 and in order to effect a quick closing of the conduit 18 by the diaphragm 24, because only a puff of flushing gas is needed, a compression spring 44 is installed between the bonnet 31 and the outer face of the diaphragm 24 to initially force the diaphragm against the outer end of the conduit 18 which would not occur otherwise due to equalization of pressure on either side of the diaphragm. This rapid closing of the outer end of the conduit 18 permits a fast build-up of gas pressure within the valve chest 22 so that the flushing system can be very quickly conditioned for a repeat discharge of flushing gas into another row of filter bags. Thus, the several rows of filter bags can be flushed in any desirable sequence and each row of filter bags in the improved dust filter module can be flushed at least once during each sixty second interval by appropriate adjustment of the timing means, not shown, governing operation of the pilot valves 38.

In such operation of the filter bag back-washing or flushing system of the improved dust filter module, the remote control means will be arranged to open one of the pilot valves 38 of the several valve chests 22 so that every row of filter bags will be flushed at sixty-second intervals, each discharge of the reservoir 28 occurring about every 6 or 7 seconds for the module shown. Thus, every bag will be cleaned once a minute.

Preferably the flushing gas is supplied to the reservoir 28 by means of a suitable compressor, not shown, so that a sufficient volume and pressure can be accumulated in the reservoir and the associated valve chests as to be able to supply 0.15 to 0.25 cubic feet of flushing gas for each square foot of filter bag area connected to reservoir 28 operating under a pressure of 6 to 15 psi.

The novel filter bag collar for mounting the tubular filter bags onto the tube sheet 10 of the herein-described dust filter module is shown in detail in FIGS. 8, 9 and 10, and in the form shown, comprises a cylindrical body 50 having an external diameter to fit within the tube sheet filter bag opening 52, the passage thru the body 50 being the opening 19 thru which the filtered gas coming into the filter bag 13 thru the fabric wall thereof passes into the clean air chamber 11. As shown, the body 15 is provided with a two-step radial flange 54 adapted to bear against the margin of the opening 52 on the dusty air side of the tube sheet 10, the outer half 56 of the width of the radial flange 54 being of reduced thickness to provide a space between the flange and the tube sheet 10 to accommodate a gasket 58 of suitable material, such as neoprene sponge, to provide a gas seal at the joint between the filter bag collar and the tube sheet. At the outermost end of the filter bag collar are a pair of oppositely-disposed radially-projecting clamping lugs 60 for effecting a bayonet-type connection of the filter bag collar and the tube sheet and for that purpose, the margin of the tube sheet opening 52 is specially formed as will now be described.

As shown in FIGS. 8 and 9, the margin of the tube sheet opening 52 is notched at diametrically-opposite places for passage of the radially-projecting clamping lugs 60, as in the case of a conventional bayonet-type fastening, the notches 62 being of an angular length slightly greater than the length of the lugs 60 and of a width such as to be within the area of the inner portion of the bag-collar flange 54. At locations angularly spaced from the notches 62, the margin of the tube sheet opening 52 is punch formed to provide an angularly-extending cam track 64 upon which the radially-projecting lugs 60 will ride to draw the flange 54 tightly against the under-side margin of the tube sheet opening 52 upon a simple quarter-twist rotation of the filter tube collar in a clockwise direction as viewed from the bottom or dusty air side of the tube sheet 10. Thus, as shown in FIG. 8, the cam track 64 rises from the plane of the tube sheet 10 at an angle of about 2 ½ degrees or such that when the clamping lugs 60 are tightly engaged on the cam track the engagement will be self-locking against a possible disconnect or loosening due to vibration.

To provide a firm bearing between the clamping lugs 60 on the cam track 64, the bottom surface 66 of each clamping lug is inclined, in the rotationally-rearward direction, at substantially the same angle relative to the plane of the tube sheet 10 as the lug-engaging surface of the cam track 64. Also, as an extra precaution against inadvertent loosening of the bayonet connection between the filter bag collar and the tube sheet, the tube sheet is provided with an upwardly-projecting detent 68 in the path of the clamping lug at the lower-most end of the cam track 64.

In the form shown, the filter bag collar body is provided with a pair of radially-projecting ribs 70 located on the under side of the flange 54 directly below the clamping lugs 60. These ribs 70 serve as handles by means of which the filter bag collar can be turned in the clamping direction to lock it in sealed engagement with the tube sheet or in the unclamping direction to align the lugs 60 with the notches 62 for removal of the collar from the tube sheet 10. Also, as shown, the lowermost end of the collar body which projects into the dusty air section of the filter is provided with an annular groove 72 in which is seated the uppermost coil of a helically-coiled filter bag stiffening element 74, which extends from end-to-end of the filter bag to keep it in normally expanded or stretched position under the forces of the filter pressure. The filter bag 13 is threaded over the support member 74 and over the inner end of the collar 50, where the filter bag fabric is clamped to the collar 50 by means of a conventional clamping ring 76 and, of course, the bottom end of the filter bag is closed.

It will now be seen that original-equipment and replacement filter bags mounted on individual bag collars 50 can most readily be mounted onto or be detached from the tube sheet 10 by a simple quarter-twist manual operation from the inside, or dusty air section, of the dust filter assembly by an operator standing on the catwalk 17. A supply of such filter bags can be kept on hand and operation of the improved filter system need never be shut down for more than the few minutes required for inspection and filter bag replacement.

As shown in FIGS. 8 and 9, the rearward end of each notch 62 in the filter-bag mounting collar 15, i.e. in the counterclockwise direction as seen from the bottom or dirty air chamber, is upset as at 63 to provide an automatic stop against turning of the collar 15 in the direction opposite the cam surface 64. This assures that the bag collar will always be turned in the proper direction to pass the detent 68 and securely engage the cam surface 64.

Figure 7:
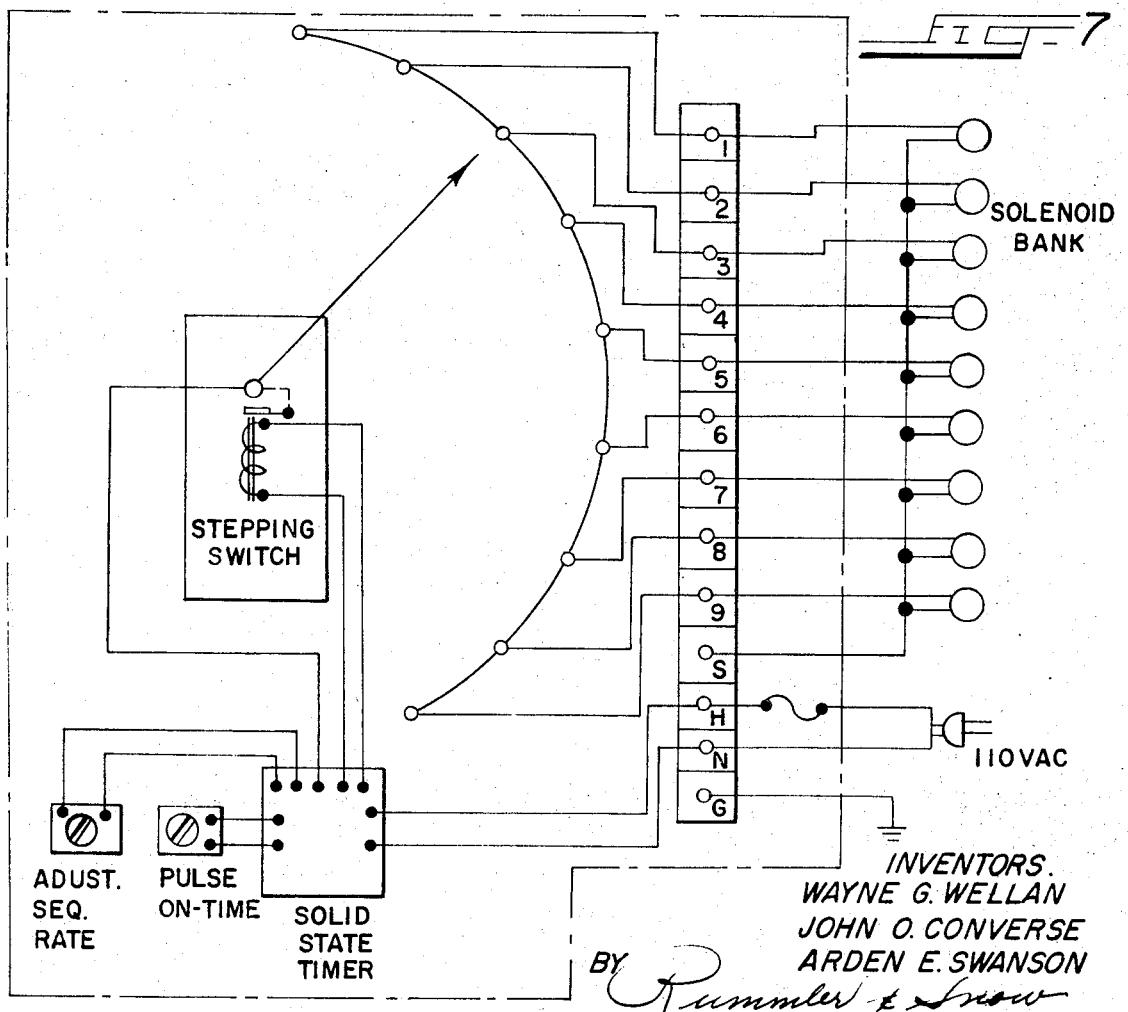
FIG. 7 is a diagrammatic view illustrating one arrangement of timing control circuit for sequential operation of the diaphragms which open and close the flushing-air ejector tube to the compressed air supply means.

The timing control system shown in FIG. 7 is a more-or-less conventional arrangement for determining the rate for sequential operation of the several solenoid-actuated pilot valves 38, so that each row of filter bags will be back-washed with clean air at regular predetermined intervals, and for timing the duration of the pilot valve open position. As indicated, adjustment means, such as a potentiometer, is provided for a solid state timer which determines the frequency of operation of a stepping switch and also the duration of the pulse of energy sent to a respective pilot-valve solenoid upon each operation of the stepping switch.

The main advantages of the herein-disclosed dust filter module reside in the filter bag back-washing or flushing system wherein all of the filter bags in a row thereof are flushed simultaneously by an individual pulse or charge of flushing gas directed into the outlet opening of each filter bag, the flushing air supply for all of the bags in the row being controlled by a single flexible diaphragm which, aside from the remote-controlled pilot valve 38, is the only mechanically-moving element in the filter plant, the several diaphragm valves being actuated by an adjustable sequencing means, as indicated in FIG. 7, which regulates the order and frequency of the pilot valve operations. Other advantages reside in the basic section construction of the filter unit and the fact that filter plants of virtually any desired capacity can be had through "add-on" connection of filter modules in side-by-side relation, the modules being connected together by simply omitting the end wall panels between two modules and bolting together the end panel flanges of the front and rear filter body walls. In such an assembly, each module could share a flushing-gas reservoir with its neighbor and each basic portion of each module would have its own valve chest and flushing-gas supply conduit arrangement.

Other advantages reside in the improved tube sheet and filter bag collar construction whereby filter bag assemblies can be easily mounted on or detached from the tube sheet by an operator standing on an inspection catwalk wherefrom all filter tubes within a filter unit or module can be readily reached.

Although but one specific embodiment of this invention has been herein shown and described, it will be understood that numerous details of the construction shown can be altered or omitted without departing from the spirit of the invention as defined by the following claims.

We claim:

1. A dust filter for cleaning a particle-laden gaseous medium comprising
   a. a rectangular housing having a dusty-gas section and a clean-gas section defined by a tube sheet separating one section from the other,
      1. said tube sheet having a plurality of parallel rows of openings therein, and
      2. a tubular filter bag having a closed end extending into the dusty-gas section from each tube sheet opening and having an open end communicating with the clean-gas section thru the said opening,
   b. a rigid collar attached to the open end of each filter bag and adapted for detachable connection with the tube sheet thru a respective opening thereof,
   c. a plurality of flushing-gas conduits in said clean-gas section each extending above and parallel with a respective row of tube sheet openings, each of said conduits having a series of gas-discharge spouts thereon and each spout extending into a respective filter bag opening, and each conduit being open at its rearward end for the introduction of flushing gas thereinto,
   d. a box-like valve chest enclosing the rearward open ends of the flushing-gas conduits and in continuous communication with a reservoir of pressured flushing gas,
   e. a diaphragm valving member mounted in said valve chest in opposition to the open end of each conduit and movable axially toward said open end to close it and liftable off said open end to open it, each diaphragm being marginally mounted on the wall of the valve chest opposite the open end of the conduit to provide a pressure chamber on the side of the diaphragm opposite the conduit opening and having a bleed passage therethrough for admitting gas pressure from the valve chest into said pressure chamber for holding the diaphragm in conduit-closing position, a pilot passage leading outwardly of the valve chest from each of said pressure chambers, and pilot means for each pilot passage for controlling gas flow therethrough and thereby the conduit opening operation of the respective diaphragm, and
   f. means for operating said pilot means sequentially whereby said conduits are opened individually one after the other for discharging pressure gas from the valve chest into all tube sheet openings of a respective row simultaneously.

2. A dust filter as defined by claim 1 wherein each of the gas discharge spouts supports a concentric flow nozzle which extends into the respective filter bag beyond the spout and which has a funnel-like inlet projecting above the filter bag opening into the said clean gas section.

3. A dust filter according to claim 1 wherein an inspection passage and a walk-way therein are provided thru the dusty-air section and between the filter bags whereby an operator can reach each of the filter bag collars attached to the tube sheet.

4. A modular dust filter assembly comprising a plurality of identical subsidiary filter portions constructed according to claim 1 and arranged in connected side-by-side relation, end walls closing the ends of the said assembly, each filter portion having a plurality of rows of filter bags extending from a respective tube sheet, the dusty-gas and clean-gas sections of each filter portion opening to the corresponding sections of an adjoining portion of the filter assembly, the open ends of the flushing-gas conduits of each filter portion being enclosed by a valve chest individual to it, and the conduit-closing diaphragms of the several valve chests being operated one at a time in predetermined sequence by the pilot means to open a respective conduit and flush the row of filter bags aligned therewith.

5. A dust filter assembly according to claim 4 wherein the clean-gas section of each filter portion is located above the dusty-gas section thereof and the said sections are separated by a horizontal tube sheet having gas-tight connection with the housing walls, the filter bags hang downwardly from the tube sheet and the parallel rows thereof extend between the front and rear walls of the housing, an inspection passage is provided through the dusty-air section transversely of the rows of filter bags, and one end wall of the filter assembly is provided with an access door aligned with the said inspection passage for entry and exit with respect thereto.

6. A dust filter assembly according to claim 1 wherein the rigid collar attached to the open end of a filter bag is a tubular member of a diameter at one end for telescopingly fitting within a filter bag for attachment thereto and of a diameter at its other end to fit within a tube sheet opening, said collar has a radial flange adjacent said other end and adapted to carry gasket means for sealing engagement with the margin of the tube sheet opening on the dusty-gas side thereof, said collar has a pair of oppositely-disposed radially-projecting lugs at its said other end for engaging the margin of the tube sheet opening on the clean-gas side thereof and locking said collar to the tube sheet, and diametrically-opposite notches are formed in the margin of the tube sheet opening for passage of said lugs from the dusty-air side to the clean-air side thereof, whereby upon rotation of the collar a bayonet joint connection is had between the said collar and the tube sheet.

7. A dust filter according to claim 6 wherein the margin of each tube sheet opening is provided with a pair of oppositely-disposed angularly-extending camming areas angularly spaced from the marginal notches for engagement by the radial lugs at the end of the rigid collar, said camming areas rising progressively from the plane of the clean-gas side of the tube sheet for drawing the collar flange tightly against the dusty-gas side of the tube sheet opening margin.

8. In a dust filtering apparatus having a tube sheet separating a dusty-gas section and a clean-gas section and having a plurality of openings each adapted for connection with the open end of a tubular filter bag extending from the tube sheet into the said dusty-gas section, a bag mounting collar comprising an open-ended cylindrical member adapted at one end for attachment of the open end of a filter bag and at the other end for entry into a tube sheet opening, said collar having a radial flange spaced from the said other end and of a width to engage the margin of the tube sheet opening from the dusty-gas side thereof, a radially-projecting lug at the said other end of the collar of a length to overlie the margin of the tube sheet opening on the clean-gas side thereof for forming a bayonet-connection therewith, said radial flange extending outwardly from said collar for mounting a compressible gasket engagable with the tube sheet to seal the margin of said opening.

9. A dust filtering apparatus according to claim 8 wherein the said radial flange has a first portion extending from the collar for direct engagement with the margin of the tube sheet opening and a second portion projecting beyond the first portion for mounting the said compressible gasket.

10. A dust filtering apparatus according to claim 8 wherein the margin of each tube sheet opening is provided with a notch for passing the lug on said collar, and a lug-camming area rising progressively from the plane of the clean-gas side of the tube sheet is formed in the margin of each of said openings in angularly-spaced relation with the said notch.

11. A dust filtering apparatus according to claim 10 wherein a detent bar rising from the said plane of the tube sheet is formed at the start of the rise of the lug-camming area.

12. A dust filtering apparatus according to claim 8 wherein a pair of radially-projecting lugs is provided on the said collar, each lug being of a length to overlie the said margin of the tube sheet opening.

13. A dust filtering apparatus according to claim 12 wherein the margin of each tube sheet opening is provided with a pair of angularly-spaced notches for passing the lugs on said collar, and a lug-camming area rising progressively from the plane of the clean-gas side of the tube sheet is formed in the tube sheet margin of each opening in angularly-spaced relation with each notch.

14. A dust filtering apparatus according to claim 13 wherein each camming area reaches its maximum height from the said plane of the tube sheet at the same angular distance from the respective notch.

15. A dust filtering apparatus according to claim 13 wherein the said notches are on diametrically-opposite sides of each of the tube sheet openings and the lugs on said collar are diametrically opposed.

16. A dust filtering apparatus according to claim 15 wherein the camming areas on the margin of each tube sheet opening reach the same maximum height at an angular distance of about 90° from the respective notch.

* * * * *